(12) United States Patent
Howard

(10) Patent No.: US 8,312,183 B2
(45) Date of Patent: *Nov. 13, 2012

(54) BUS PORT POWER MANAGEMENT

(75) Inventor: John S. Howard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/763,994

(22) Filed: Apr. 20, 2010

(65) Prior Publication Data

US 2010/0205328 A1    Aug. 12, 2010

Related U.S. Application Data

(63) Continuation of application No. 11/170,771, filed on Jun. 29, 2005, now Pat. No. 7,702,825.

(51) Int. Cl.
*G06F 3/00* (2006.01)
(52) U.S. Cl. .......................... 710/36; 710/46
(58) Field of Classification Search ............ 710/36
See application file for complete search history.

(56) References Cited

U.S. PATENT DOCUMENTS

| | | | |
|---|---|---|---|
| 5,517,650 | A | 5/1996 | Bland et al. |
| 6,067,591 | A | 5/2000 | Howard et al. |
| 6,389,501 | B1 | 5/2002 | Garney et al. |
| 6,567,921 | B1 * | 5/2003 | Guziak ............ 713/322 |
| 6,606,674 | B1 | 8/2003 | Howard |
| 6,678,761 | B2 | 1/2004 | Garney |
| 6,684,272 | B1 | 1/2004 | Leete et al. |
| 6,701,399 | B1 | 3/2004 | Brown |
| 6,721,815 | B1 | 4/2004 | Leete et al. |
| 6,748,465 | B2 | 6/2004 | Howard et al. |
| 6,771,664 | B1 | 8/2004 | Garney et al. |
| 6,792,495 | B1 | 9/2004 | Garney et al. |
| 6,813,251 | B1 | 11/2004 | Garney et al. |

(Continued)

FOREIGN PATENT DOCUMENTS

WO    WO-2007002958 A2    1/2007

(Continued)

OTHER PUBLICATIONS

"Advanced Configuration and Power Interface Specification (Revision 2.0b)", Compaq Computer Corporation, Intel Corporation, Microsoft Corporation, Phoenix Technologies Ltd., Toshiba Corporation, (Oct. 11, 2002), 502 pgs.

(Continued)

*Primary Examiner* — Henry Tsai
*Assistant Examiner* — John Roche
(74) *Attorney, Agent, or Firm* — Matthew C. Fagan

(57) ABSTRACT

For one disclosed embodiment, an apparatus comprises a display and a circuit. The circuit has a first port to be coupled to communicate over data lines with a Universal Serial Bus (USB) port of a device external to the apparatus. The circuit is operable to detect resume signaling of a duration of less than one millisecond and to transition the first port from a first state corresponding to an idle state of the data lines to a second, enabled state in response to the resume signaling. For one disclosed embodiment, the circuit is operable to drive resume signaling for a duration of less than one millisecond to initiate transition of the first port from a first state corresponding to an idle state of the data lines to a second, enabled state. Other embodiments are also disclosed.

28 Claims, 5 Drawing Sheets

U.S. PATENT DOCUMENTS

| | | | |
|---|---|---|---|
| 6,912,605 | B1 | 6/2005 | Wright |
| 6,952,429 | B2 | 10/2005 | Garney et al. |
| 7,007,110 | B2 | 2/2006 | Howard |
| 7,007,119 | B2 | 2/2006 | Howard et al. |
| 7,028,124 | B2 | 4/2006 | Leete et al. |
| 7,131,035 | B2 | 10/2006 | Gulick et al. |
| 7,194,583 | B2 | 3/2007 | Hesse et al. |
| 7,213,096 | B2 | 5/2007 | Keys et al |
| 7,228,366 | B2 | 6/2007 | Abramson et al. |
| 7,281,074 | B2 | 10/2007 | Diefenbaugh et al. |
| 7,340,550 | B2 | 3/2008 | Derr et al. |
| 7,490,255 | B2 | 2/2009 | Diefenbaugh et al. |
| 7,702,825 | B2 | 4/2010 | Howard |
| 2002/0144165 | A1 | 10/2002 | Wright |
| 2003/0163627 | A1* | 8/2003 | Deng et al. ............ 710/305 |
| 2003/0212841 | A1* | 11/2003 | Lin .................... 710/62 |
| 2004/0024918 | A1* | 2/2004 | Skidmore et al. ............ 710/1 |
| 2004/0073697 | A1* | 4/2004 | Saito et al. ............ 709/233 |
| 2004/0193715 | A1 | 9/2004 | Froelich et al. |
| 2004/0268010 | A1 | 12/2004 | Garney et al. |
| 2005/0033892 | A1 | 2/2005 | Garney et al. |
| 2005/0289363 | A1 | 12/2005 | Tsirkel et al. |
| 2006/0067280 | A1 | 3/2006 | Howard et al. |
| 2006/0072487 | A1 | 4/2006 | Howard |
| 2006/0218423 | A1 | 9/2006 | Diefenbaugh et al. |
| 2006/0294400 | A1 | 12/2006 | Diefenbaugh et al. |
| 2007/0005824 | A1 | 1/2007 | Howard |
| 2007/0005859 | A1 | 1/2007 | Diefenbaugh et al. |
| 2007/0005987 | A1 | 1/2007 | Durham et al. |
| 2007/0005995 | A1 | 1/2007 | Kardach et al. |
| 2007/0006000 | A1 | 1/2007 | Jain et al. |
| 2007/0008887 | A1 | 1/2007 | Gorbatov et al. |
| 2007/0079154 | A1 | 4/2007 | Diefenbaugh et al. |
| 2008/0005445 | A1 | 1/2008 | Diefenbaugh et al. |
| 2009/0216981 | A1 | 8/2009 | Diefenbaugh et al. |

FOREIGN PATENT DOCUMENTS

| | | | |
|---|---|---|---|
| WO | WO-2007002958 | A3 | 1/2007 |

OTHER PUBLICATIONS

"China Application U.S. Appl. No. 200680023103.3, Office Action mailed Jun. 5, 2009", 8 pgs.

"Germany Application Serial No. 112006001547, Office action mailed Dec. 7, 2009", 4.

"International Application Serial No. PCT/US2006/026457, Search Report mailed Dec. 13, 2006", 1 pg.

International Application Serial No. PCT/US2006/026457, Written Opinion mailed Dec. 13, 2006, 5 pgs.

"Universal Serial Bus Specification", *Revision 2.0, The Universal Serial Bus Implementation Forum (USB-IF)*, (Portland, OR), (Apr. 27, 2000), 622 pgs.

Anderson, D. et al., "Chapter 9: USB Power Conservation, in *Universal Serial Bus System Architecture*", (Mar. 31, 2001), pp. 201-2.

Anderson, D., et al., "Chapter 9: USB Power Conservation", in *Universal Serial Bus System Architecture*, (Second Edition), Mind Share, Inc., Addison Wesley Professional, (Mar. 2001), 195-209.

Intel, C. et al., "Universal Serial Bus Specification", *Revision 2.0 The Universal Serial Bus Implementation Forum (USB-F)*. (Apr. 27, 2000), 154-157.

"German Application Serial No. 112006001547.8-53, Office Action mailed Sep. 1, 2010", 2 pgs.

"Germany Application Serial No. 112006001547, Response filed May 20, 2010 to Office Action mailed Dec. 7, 2009", 18 pgs.

"Taiwanese Application Serial No. 95123645, Office Action mailed Nov. 24, 2010", 13 pgs.

State Intellectual Property Office, P.R. China Second Office Action for corresponding Patent Application No. 2006800231033, mailed Mar. 9, 2011, 3 pages.

English Translation of State Intellectual Property Office, P.R. China Second Office Action for corresponding Patent Application No. 200680023103.3, mailed Mar. 9, 2011, 6 pages.

German Patent and Trade Mark Office Decision for corresponding Patent Application No. 11 2006 001 547.8, mailed Jan. 21, 2011, 7 pages.

English Translation of German Patent and Trade Mark Office Decision for corresponding Patent Application No. 11 2006 001 547.8, mailed Jan. 21, 2011, 10 pages.

State Intellectual Property Office, P.R. China Third Office Action for corresponding Patent Application No. 200680023103.3, mailed Sep. 6, 2011, 3 pages.

English Translation of State Intellectual Property Office, P.R. China Third Office Action for corresponding Patent Application No. 200680023103.3, mailed Sep. 6, 2011, 5 pages.

* cited by examiner

BUS PORT POWER MANAGEMENT

RELATED APPLICATION

This application is a continuation of U.S. application Ser. No. 11/170,771, filed Jun. 29, 2005 now U.S. Pat. No. 7,702,825, which is incorporated herein by reference in its entirety.

FIELD

Embodiments of the present invention relate to electronic data communication, and particularly to suspend and resume operations in USB protocols.

BACKGROUND

USB is one type of connection to allow transfer of data between electrical systems or devices. The Universal Serial Bus Implementers Forum (USB-IF), in Portland, Oreg., U.S.A., manages and publishes the specifications for USB. Several specification revisions of USB have been published by USB-IF. At the time of this writing, USB 2.0 published in Apr. 27, 2000 is the latest USB specification revision and is compatible with earlier USB specification revisions such as USB 1.0 and USB 1.1. In the description described herein, USB 2.0 refers to the USB 2.0 specification revision and all other earlier USB specification revisions published by the USB-IF.

USB 2.0 includes a suspend operation to allow a USB device to enter a suspend state. USB 2.0 requires a USB device to enter the suspend state after a specific time of idling or inactivity on the USB connection. USB 2.0 also includes a resume operation to allow a USB device to exit the suspend state. USB 2.0 requires the resume operation to last for some specific time.

The timing requirements for the suspend and resume operations as specified in USB 2.0 may limit the power management for some systems having USB. For other systems, especially for systems that draw power mainly from a battery, the timing requirements for the suspend and resume operations may be too large, causing USB as specified in USB 2.0 to be an unfavorable choice for connectivity in some of these systems.

DESCRIPTION OF EMBODIMENTS

Figure 1:
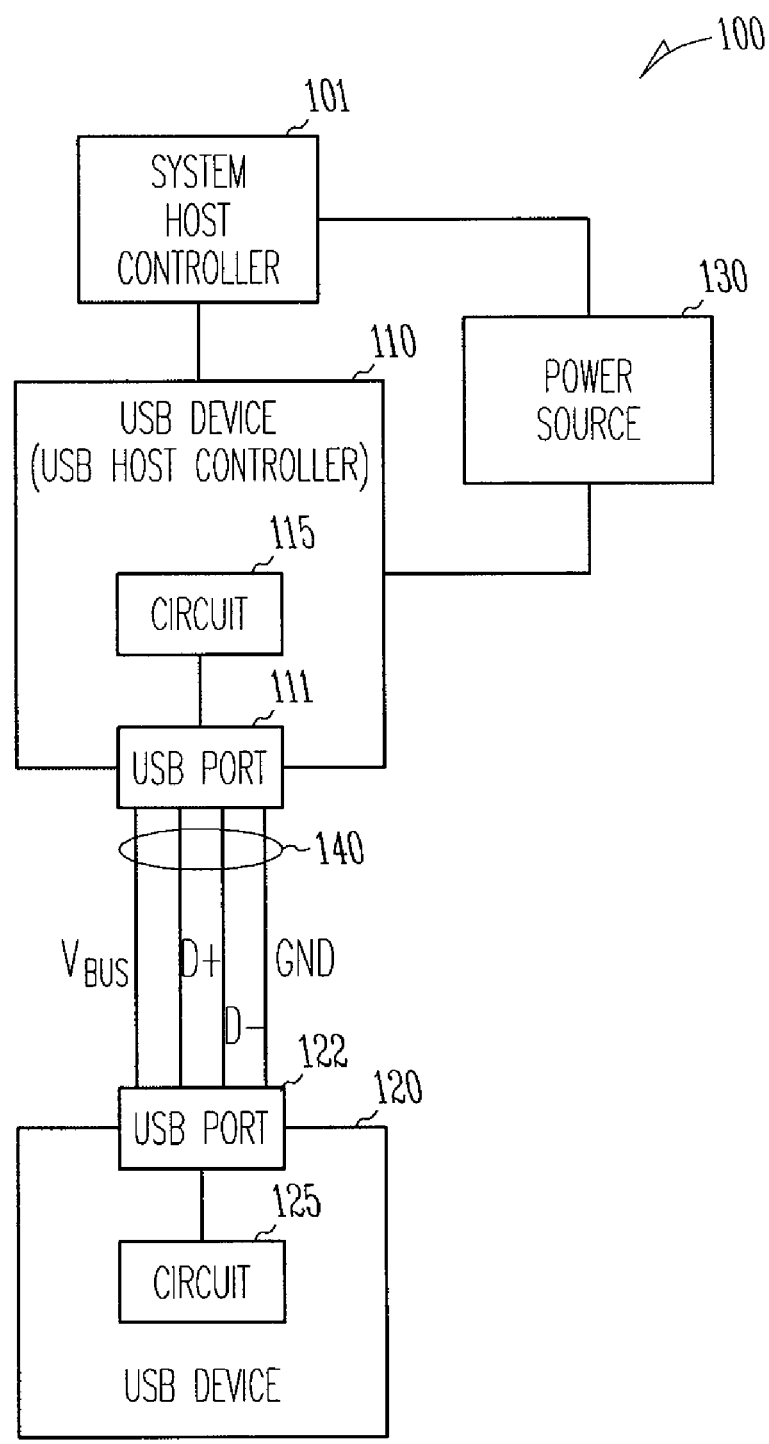
FIG. 1 shows an apparatus having USB devices according to an embodiment of the invention.

FIG. 1 shows an apparatus having USB devices according to an embodiment of the invention. Apparatus 100 includes a system host controller 101, USB devices 110 and 120, and a power source 130. USB ports 111 and 122, and a USB segment 140 allow USB devices 110 and 120 to communicate with each other. Each of the USB ports 111 and 122 includes transmitters and receivers to transmit and receive data. USB segment 140 includes a power line ($V_{BUS}$), a ground line (GND), and data lines (D+ and D−) according to USB 2.0 specification. Power source 130 supplies power to apparatus 100. In some embodiments, power source 130 includes a battery. System host controller 101 includes any combination of hardware, firmware, and software to control operations of apparatus 100. System host controller 101 may include a general-purpose processor or an application specific integrated circuit (ASIC). USB device 110 may be a USB host controller to allow apparatus 100 to communicate with one or more other USB devices inside or outside apparatus 100, besides USB device 120. Circuits 115 and 125 control USB ports 111 and 122, respectively, to transfer data between USB devices 110 and 120. Data described herein refers to signals that represent any combination of data information, address information, status information, control information, and other information.

In some embodiments, a portion or an entire apparatus 100 resides in a host system. Examples of host systems include desktop computers, laptop computers, digital cameras, video game devices, personal digital assistant (PDA) devices, cellular phones, and other digital systems.

Each of the USB devices 110 and 120 performs a single function or multiple functions. Examples of the functions performed by USB device 110 include function of an input/output controller to control input and output data in a system such as a computer or any one of the systems mentioned in the examples. Examples of functions performed by USB device 120 include functions of keyboards or keypads, displays, pointing devices, gaming devices, audio devices, video devices, and storage devices.

USB devices 110 and 120 comply with USB 2.0. In addition, USB devices 110 and 120 include enhanced suspend and resume operations that are different from the suspend and resume operations specified in USB 2.0.

In FIG. 1, USB devices 110 and 120 have different operating states including an enabled state and a suspend state. In the enabled state, USB devices 110 and 120, and USB segment 140 are enabled (active) and ready to transfer data or are actively transferring data. In the suspend state, all or a portion of apparatus 100 is suspended (deactivated or idled). In some embodiments, USB device 110 initiates a suspend operation to suspend USB port 111 and to allow USB port 122, or USB device 120, or both to enter the suspend state. The initiation of the suspend operation may be based on either the configuration of USB device 110 or the configuration of system host controller 101. For example, in systems such as laptop computers or cellular phones, the power from power source 130 may be mainly supplied by a battery. To extend the battery life in these systems, USB device 110 or system host controller 101 may be configured to aggressively suspend a portion of apparatus 100 such as one of the USB port 111, USB port 122, USB device 120, or any combination of USB port 111, USB port 122, and USB device 120. In apparatus 100, the suspend operation includes a bi-directional communication between USB devices 110 and 120.

Figure 2:
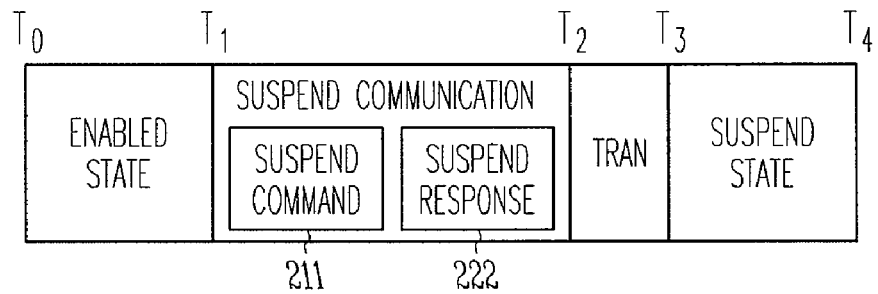
FIG. 2 shows an exemplary timing diagram for a suspend operation of the apparatus of FIG. 1.

FIG. 2 shows an exemplary timing diagram for a suspend operation of the apparatus of FIG. 1. In FIG. 2, an enabled state occurs between times T0 and T1, a suspend communication occurs between times T1 and T2, a transition interval (TRAN) occurs between times T2 and T3, and a suspend state occurs between times T3 and T4.

In the enabled state, USB ports 111 and 122 are enabled; USB segment 140 is active; and USB devices 110 and 120 are ready to exchange data with each other. USB device 110 may broadcast transaction signaling to USB port 111. The broadcast transaction signaling may include timing reference such as USB microframe and USB frame as specified in USB 2.0.

At time T1, USB device 110 may stop broadcasting transaction signaling to USB port 111 and initiate the suspend communication to prepare USB port 111 for the suspend state.

At time T2, the suspend communication between USB devices 110 and 120 is completed. Between times T2 and T3 in the transition interval, USB device 110 prepares to suspend USB port 111. USB device 120 may prepare to place either only USB port 122 into the suspend state or both USB device 120 and USB port 122 into the suspend state.

At time T3, USB device 110 places USB port 111 into the suspend state. USB port 122, USB device 120, or both USB port 122 and USB device 120 enter the suspend state. USB segment 140 is deactivated or idling at time T3. In some embodiments, between times T2 and T3, USB device 120 may remain in the enabled state while USB port 122 is in the suspend state. Thus, between times T2 and T3, the state of USB port 122 and the state USB device 120 may be different. A USB port or a USB device uses less power in the suspend state than in the enabled state. For example, the amount of power used by USB device 120 in the suspend state is less than the amount of power used by USB device 120 in the enabled state.

During the suspend communication, USB device 110 sends USB device 120 a suspend command 211. Suspend command 211 may include information to notify USB device 120 to place either only USB port 122 into the suspend state or both USB port 122 and USB device 120 into the suspend state. As mentioned above, USB 120 may remain at a state that is different from the suspend state when USB port 122 is in the suspend state. For example, USB device 120 may stay in the enabled state while USB port 122 is in the suspend state.

In FIG. 2, upon receiving suspend command 211, USB device 120 sends USB device 110 a suspend response 222 to acknowledge suspend command 211. Thus, the suspend communication between USB devices 110 and 120 is a bi-directional communication in which both USB devices 110 and 120 exchange data with each other.

In some embodiments, suspend command 211 in FIG. 2 includes at least one suspend transaction. The suspend transaction may include a suspend token packet containing information to notify USB device 120 that USB device 110 is in the process of suspending USB port 111 at which USB device 120 is coupled. The suspend token packet described herein carries information different from the information carried by any token packet according to USB 2.0. For example, besides including the packet identifier (PID) such as OUT or SETUP as in USB 2.0, the suspend token packet described herein may also include additional information that specifically indicates the suspend token is for the suspend communication. As another example, the PID of the suspend token packet described herein may be a new PID category, for example "SUSPEND" PID or "SLEEP" PID, which is reserved only for the suspend communication. Therefore, when a USB device such as USB device 120 detects or receives the suspend token packet included in suspend command 211 of FIG. 2, the USB device readily recognizes that a suspend communication is initiated and that appropriate actions are needed for a response.

In other embodiments, suspend command 211 in FIG. 2 includes a suspend signaling instead of a suspend transaction. The suspend signaling is a form of a special signaling or a chirp that is different from the signaling of a transaction. A transaction has specific data packet formats, whereas a special signaling has no data packet format. In FIG. 2 the suspend signaling included in suspend command 211 may be a chirp or a series of chirps (a series of special signaling). An example of activities to create a chirp (special signaling) includes connecting one of the data lines (D+ or D−) of USB segment 140 to either ground or a power source and driving an amount of current on the other data line for a specific duration (time). For example, the chirp may be a chirp M in which chirp M may be created by connecting the data line D− of USB segment 140 to ground and driving an amount of current on the data line D+ for a specific duration. As another example, the chirp may be a chirp N in which chirp N may be created by connecting the data line D+ the USB segment 140 to a power source and driving an amount of current the data line D− for a specific duration.

In some embodiments, the suspend signaling may be a series of chirps M, a series of chirps N, or a series of alternating chirp M and chirp N. USB 2.0 has signaling created by chirp J and chirp K. However, the suspend signaling created by chirp M and chirp N described herein is intentionally created to be different from any kind of signaling created by chirp J and chirp K of USB 2.0.

In some embodiments, suspend response 222 in FIG. 2 (sent by USB device 120 of FIG. 1) includes at least one respond transaction. The respond transaction may include a handshake packet. The handshake packet may include information to acknowledge the recognition or the receipt of suspend command 211 sent by USB device 110. In some embodiments, the handshake packet described herein may include the ACK handshake packet as in USB 2.0. In other embodiments, the handshake packet described herein carries information different from the information carried by any handshake packet according to USB 2.0. For example, besides including a PID such as ACK, NAK, STALL, or NYET as in USB 2.0, the handshake packet described herein may also include additional information that specifically indicates information related to the suspend communication. Therefore, when a USB device such as USB device 110 detects or receives the handshake packet described herein, the USB device such as USB device 110 readily recognizes that the suspend command, such as suspend command 211, is recognized or received by a USB device such as USB device 120.

In other embodiments, suspend response 222 in FIG. 2 includes a respond signaling instead of a respond transaction. Similarly to the suspend transaction and suspend signaling represented by suspend command 211, the respond transaction represented by suspend response 222 has specific packet formats whereas the respond signaling has no packet format. The respond signaling may be a chirp such as chirp M and chirp N described above. The respond signaling may also be a series of chirps M, a series of chirps N, or a series of alternating chirp M and chirp N.

The above description shows that the suspend communication in FIG. 2 is a bi-directional communication between USB devices 110 and 120. As described above, suspend command 211 may include either a suspend transaction or a suspend signaling; suspend response 222 may also include either a suspend transaction or a suspend signaling. In some embodiments, the suspend communication in FIG. 2 may include the same communication type. For example, both suspend command 211 and suspend response 222 may include either suspend transactions or suspend signaling. In other embodiments, the suspend communication may include a mix of signaling and transaction. For example, suspend command 211 may include a suspend signaling whereas suspend response 222 may include a respond transaction. As another example, suspend command 211 may include a suspend transaction whereas suspend response 222 may include a respond signaling.

USB 2.0 allows data to be transferred between USB devices at three different transfer rates or speeds: low speed, full speed, and high speed. The low, full, and high speeds correspond to data transfer rates of 1.5 Mb/s, 12 Mb/s, and 480 Mb/s, respectively. Mb/s stands for megabits per second ($10^6$ bits per second). Thus, a high-speed USB device may transfer data on a USB segment at a rate up to 480 Mb/s. A USB segment may be in a low speed, full speed, or high speed mode depending on the speed of the USB device. During the suspend state, USB 2.0 requires a USB segment coupled to a low-speed device to be placed into a low-speed idle state, a USB segment coupled to a full-speed device to be placed into full-speed idle state. For a high-speed device during the suspend state, USB 2.0 requires a USB segment coupled to the high-speed USB device to be switched from the high-speed mode to the full-speed idle state, as in the case of the full-speed device.

Thus, according to USB 2.0, a USB segment during the suspend state is placed into either the low-speed idle state or into the full-speed idle state. In both the low-speed idle and full-speed idle states, one of the data lines (D+ or D−) of the USB segment is coupled to a power source through a pull-up resistor. Current or charge from the power source may leak to ground through the pull-up resistor, thereby power may be wasted.

In apparatus 100 of FIG. 1, the data lines of USB segment 140 are decoupled from the power source during the suspend state. Thus, apparatus 100 may avoid the current leakage through the pull-up resistor during the suspend state, thereby power may be saved.

In some embodiments, USB device 120 of FIG. 1 is a high-speed USB device and USB segment 140 is in a high-speed mode during the enabled state. During the suspend state of apparatus 100 of FIG. 1, USB segment 140 is not switched from the high-speed mode to the full-speed idle state. USB segment 140 is kept at the same high-speed mode during the enabled state and during the suspend state. In contrast, as described above, USB 2.0 requires a USB segment in the high-speed mode during the enabled state to be switched to the full-speed idle during the suspend state.

Keeping USB segment 140 of apparatus 100 at the same high speed mode during the enabled state and during the suspend state may reduce design complexity. In the high-speed mode, both data lines (D+ and D−) of a USB segment are coupled to ground when the USB segment is not transferring data. Switching the USB segment from the high-speed mode to the full-speed idle state during the suspend state, as required by USB 2.0, involves activities such as disconnecting a data line of the USB segment from ground and connecting the data line to the power source through the pull-up resistor. The design complexity in apparatus 100 may be reduced because the data lines of USB segment 140 may not need to be switched between ground and the power source.

Further, keeping USB segment 140 in apparatus 100 at the same high speed mode during the enabled state and during the suspend state may also save power in the suspend state. For example, since the data lines (D+ and D−) of USB segment 140 remain coupled to ground or decoupled from the power source during the suspend state, current leakage through the pull-up resistor may be avoided, thereby power may be saved.

As mentioned above, USB device 110 includes a mechanism to distinguish between the active state and the idle state of USB segment 140. Thus, USB device 110 is able to distinguish between the high-speed mode of USB segment 140 during the enabled state and the high speed mode of USB segment 140 during the suspend state so that USB device 110 may send appropriate signaling on USB segment 140 to communicate with USB device 120 during both active state and idle state of USB segment 140.

In some embodiments, the last activity on USB segment 140 of FIG. 1 may occur at time T1 (FIG. 2) such that from time T1 to time T3, USB segment 140 is active but may be idling. In USB 2.0, a USB device such as USB device 120 may enter the suspend state only after three milliseconds of inactivity or idling on a USB segment. Thus, in USB 2.0, a USB device such as USB device 120 may enter the suspend state at time T3 where T3 is at least three milliseconds counting from T1 when the last activity occurs at time T1. In apparatus 100, however, USB device 120 is allowed to enter the suspend state at time T3 where T3 is less than three milliseconds counting from T1. In apparatus 100, although USB device 120 may enter the suspend state by itself after the three milliseconds of inactivity on USB segment 140, USB device 120 may also prepare to enter the suspend state when the suspend communication is initiated. In apparatus 100, the suspend communication may be initiated before three milliseconds of inactivity on USB segment 140. In some embodiments, the suspend communication lasts in the order of microseconds and less than one millisecond and the transition interval between T2 and T3 is about ten microseconds. Thus, in apparatus 100, USB device 120 may enter the suspend state before three milliseconds of inactivity on USB segment 140. Entering the suspend state before three milliseconds of inactivity or idling on a USB segment may improve power management in apparatus 100.

As specified in USB 2.0, a USB device such as USB device 120 of FIG. 1 can begin to make a transition from a powered state to suspend state after more than three milliseconds of idling or inactivity on a USB segment such as USB segment 140 that couples to the USB device. Since the factor to allow the USB device in USB 2.0 to enter the suspend state depends on the presence or absence of activity on the USB segment, the suspend operation in USB 2.0 may be referred to as a "passive" suspend operation. In contrast, the suspend operation of apparatus 100 of FIG. 1 may be referred to as an "active" suspend operation because USB port 122, USB device 120, or both USB port 122 and USB device 120 enters the suspend state after an active bi-directional communication between USB devices 110 and 120.

In some embodiments, USB device 120 may include a configuration descriptor register to indicate a capability of supporting the active suspend operation described herein. In these embodiments, USB device 110 may recognize the capability of supporting the active suspend operation of USB device 120 during a USB enumeration process or during the suspend communication. USB devices 110 and 120 may both use the active suspend operation.

In other embodiments, USB device 110 may support the active suspend operation described above while USB device 120 is incapable of supporting the active suspend operation. In these embodiments, USB device 110 may recognize the incapability of supporting the active suspend operation by USB device 120 during a USB enumeration process. Therefore, during the normal operation after the USB enumeration process, USB device 110 may not initiate the suspend communication, for example, USB device 110 may not send suspend command 211 (FIG. 2) to initiate the suspend communication. In this case, the suspend operation may be performed as specified in USB 2.0.

In some other embodiments, USB device 110 may support the active suspend operation while USB device 120 is incapable of supporting the active suspend operation. In these embodiments, USB device 110 may be unaware of the incapability of supporting the active suspend operation by USB device 120. Thus, USB device 110 may still send suspend command 211 (FIG. 2) to initiate the suspend communication. In some embodiments, USB device 110 is configured to abort suspend communication after a time interval of no response from USB device 120 after suspend command 211 is sent. In this case, the suspend operation may be performed as specified in USB 2.0.

Figure 3:
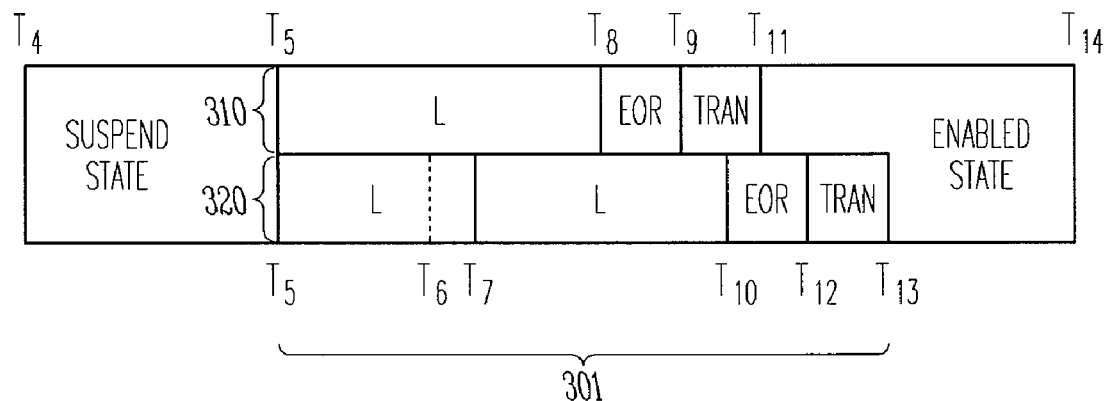
FIG. 3 shows an exemplary timing diagram for a resume operation of the apparatus of FIG. 1.

FIG. 3 shows an exemplary timing diagram for a resume operation of the apparatus of FIG. 1. FIG. 3 shows a suspend state between times T4 and T5, an enabled state beginning from either time T11 or T13 to time T14, a resume operation 301 beginning from time T5 and completing at either time T9 or T12, and a transition interval (TRAN) between times T9 and T11 or between times T12 and T13. Resume operation 301 includes two different resume communications 310 and 320. Depending which one of the USB devices 110 or 120 (FIG. 1) initiates resume operation 301, only one of the resume communications 310 and 320 is performed during resume operation 301. Resume communication 310 is performed if USB device 110 initiates resume operation 301. Resume communication 320 is performed if USB device 120 initiates resume operation 301.

In embodiments where USB device 110 is a USB host controller, resume communication 310 in FIG. 3 may be referred to as host-initiated resume communication; resume communication 320 may be referred to as device-initiated resume communication or remote-wakeup resume communication. As mentioned above, resume communication 320 is performed if USB device 120 initiates resume operation 301. In some embodiments, USB device 120 may initiate the resume communication to allow USB port 122 or both USB port 122 and USB device 120 to exit the suspend state only after receiving a permission from USB device 110 during the suspend communication described in FIG. 2. For example, USB device 110 may include the permission in suspend command 211 during the suspend communication. In other embodiments, USB device 120 may initiate the resume communication to exit the suspend state only after a remote-wakeup capability of USB device 120 is enabled before the suspend communication. In some embodiments, the remote-wakeup capability of USB device 120 may be enabled by USB device 110. For example, USB device 110 may enable the remote-wakeup capability of USB device 120 by setting a value in a configuration descriptor register of USB device 120 during a USB enumeration or configuration process before a suspend communication.

The suspend state in FIG. 3 may represent the suspend state in FIG. 2. In the suspend state in FIG. 3, USB segment 140 (FIG. 1) is in the idle state with no active signaling activity being present. To resume communication between USB devices 110 and 120, either USB device 110 or USB device 120 may initiate the resume operation to establish connectivity.

In the case where USB device 110 initiates resume operation 301, resume communication 310 is performed. At time T5, USB device 110 starts to change the state of USB port 111 from the suspend state to a different state such as the enabled state. For example, at time T5, USB device 110 starts to drive data "L" signaling on USB segment 140 for a duration from time T5 to time T8. The data L signaling refers to differential voltage on the data lines (D+ and D−) of USB segment 140 where one of the data lines has a higher voltage than the other data line. USB 2.0 has data J and data K signaling. The data L signaling of FIG. 3 has a different driving duration from that of the data J or data K of USB 2.0. At time T8 in FIG. 3, USB device 110 issues an End-of-Resume (EOR) signaling on USB segment 140. The EOR signaling indicates that resume communication 310 is completed. In some embodiments, the EOR may be the End-of-Packet (EOP) of USB 2.0. Upon detection of the EOR signaling and after a transition interval occurred between times T9 and T11, USB device 120 may take USB port 122 out of the suspend state and place USB port 122 into the enabled state. If both USB port 122 and USB device 120 were in the suspend state before time T11, USB device 120 may take both USB port 122 and USB device 120 out of the suspend state and place either USB port 122 or both USB port 122 and USB device 120 into the enabled state. Thus, at time T11 in FIG. 3, USB device 120 may take at least port USB port 122 out of the suspend state and place at least USB port 122 into the enabled state. At time T11, USB segment 140 is activated or enabled. USB device 110 may broadcast communication packets to USB device 120 at time T11. In some embodiments, the duration between times T5 and T8 is about 50 microseconds; the duration between times T9 and T11 is about ten microseconds.

In the case where USB device 120 initiates resume operation 301, resume communication 320 is performed. At the beginning of resume communication 320 in FIG. 3 at time T5, USB device 120 starts to change the state of USB port 122 from the suspend state to a different state such as the enabled state. For example, at time T5, USB device 120 starts to drive the data L signaling on USB segment 140 for a duration from time T5 to time T7. The duration to the drive data L signaling from time T5 to T7 in resume communication 320 may be different from the duration to drive the data L signaling from time T5 to T8 in resume communication 310 described above. At time T7, USB device 120 stops driving the data L signaling and begins to detect or listen for signaling activity on USB segment 140.

In FIG. 3, at a time such as time T6, USB device 110 may recognize the data L signaling driven by USB device 120. In response, USB device 110 begins to drive the data L signaling to USB device 120 from time T6 to time T10. At time T10, USB device 110 issues the EOR signaling on USB segment 140. The EOR signaling indicates that resume communication 310 is completed. In some embodiments, the EOR may be the End-of-Packet (EOP) of USB 2.0. Upon the detection of the EOR signaling and after a transition interval occurred between times T12 and T13, USB device 120 may take USB port 122 out of the suspend state and place USB port 122 into the enabled state. If both USB port 122 and USB device 120 were in the suspend state before time T13, USB device 120 may take both USB port 122 and USB device 120 out of the suspend state and place either USB port 122 or both USB port 122 and USB device 120 into the enabled state. Thus, at time T13 in FIG. 3, USB device 120 may take at least port USB port 122 out of the suspend state and place at least USB port 122 into the enabled state. At time T13, USB segment 140 is activated or enabled. USB device 110 may broadcast communication packets to USB device 120 at time T13. In some embodiments, the duration between times T5 and T7 is about 25 microseconds; T6 is about 15 microseconds from T5; the duration between times T6 and T10 is about 50 microseconds; and the duration between times T12 and T13 is about ten microseconds.

In resume operation 301 described above, the duration for resume operation 301 may be dependent mainly on the capability of USB device 110 and USB device 120 to detect and recognize the change in the state of USB segment 140 such as the data L signaling and the EOR signaling. Thus, resume operation 301 may be performed in a relatively smaller duration in comparison to that in USB 2.0. For example, the duration of resume operation 301 may be less than one hundred microseconds, which may be sufficient for both USB devices 110 and 120 to complete the resume operation. Smaller duration for the resume operation may improve power management in apparatus 100.

In embodiments where one of the USB devices 110 and 120 may lack support for a resume operation such as resume operation 301 described in FIG. 3, the resume operation between USB devices 110 and 120 may be performed according to USB 2.0.

Figure 4:
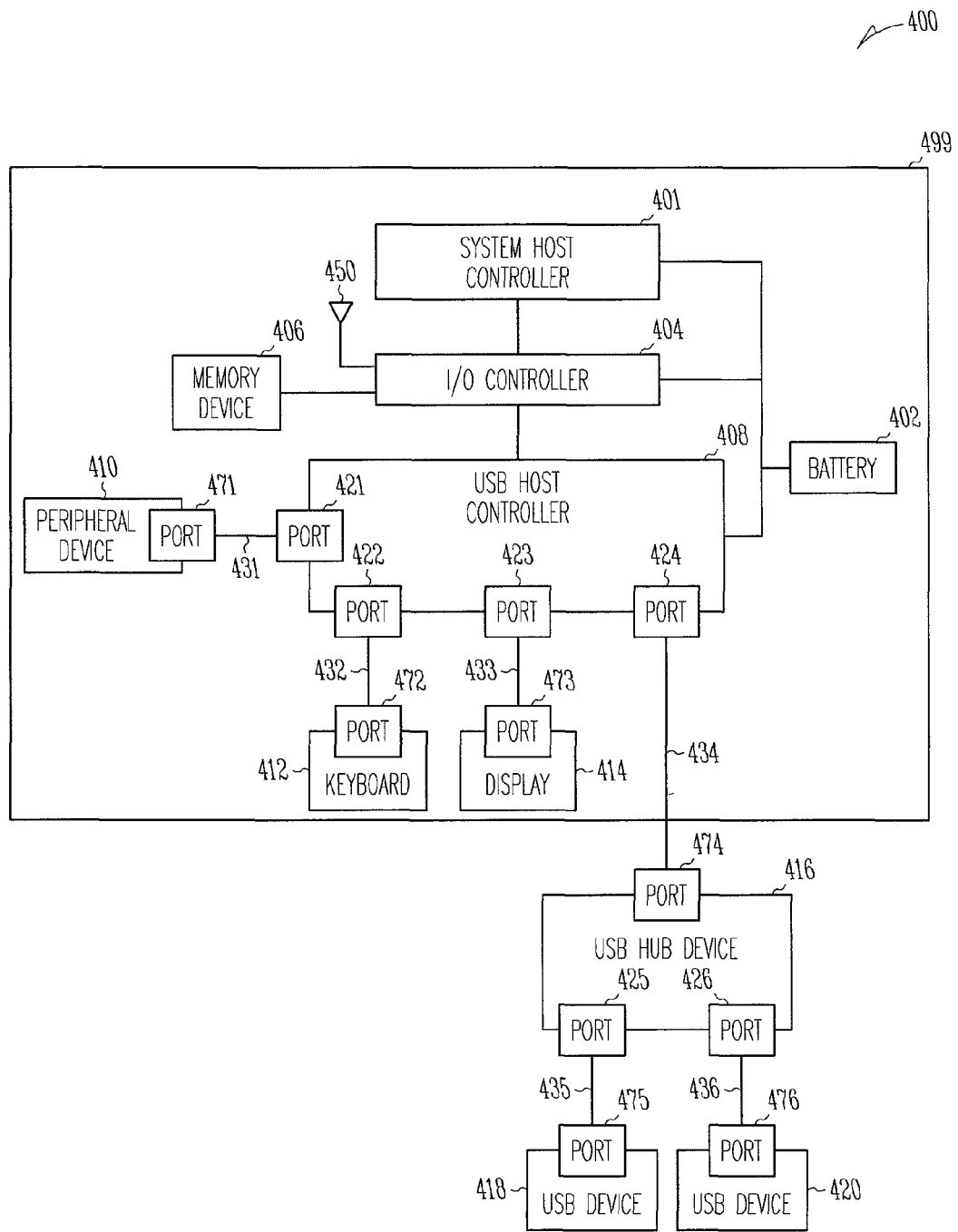
FIG. 4 shows a system having USB devices according to an embodiment of the invention.

FIG. 4 shows a system having USB devices according to an embodiment of the invention. System 400 includes a system host controller 401, an input/output (I/O) controller 404, a memory device 406, and a USB host controller 408 including a number of root ports 421, 422, 423, and 424. Each of the USB segments 431, 432, 433, 434 provides a point-to-point connection between USB host controller 408 and one of the peripheral device 410, keypad or keyboard 412, display 414, and USB hub device 416.

Each of the peripheral device 410, keypad or keyboard 412, display 414, and USB hub device 416 includes a USB port (471, 472, 473, or 474) coupled to one of the USB segments 431, 432, 433, 434. USB hub device 416 includes non-root ports 425 and 426 to provide additional attachment points to allow additional USB devices to attach to USB host controller 408. For example, USB device 418 having USB port 475 may attach to USB host controller 408 through USB segment 435 and hub device 416. As another example, USB device 420 having USB port 476 may attach to USB host controller 408 through USB segment 436 and USB hub device 416.

In the embodiments represented by FIG. 4, peripheral device 410, keypad or keyboard 412, and display 414 include USB functions and are coupled to USB host controller 408. In some embodiments, one or more of the peripheral device 410, keypad or keyboard 412, and display 414 may include non-USB functions and may couple to I/O controller 404 instead of to USB host controller 408.

System 400 further includes an antenna 450. Antenna 450 may be one or more of a patch, omnidirectional, beam, monopole, dipole, and rhombic antenna, among others. Antenna 450 provides an option for system 400 to communicate with other systems or devices via wireless media.

System 400 further includes a battery 402 to supply power to system 400. In some embodiments, system 400 may use power supplied from an electrical outlet such as a home or office electrical outlet.

In some embodiments, the entire system 400 may be included in a single system unit. For example, the entire system 400 may be included in a desktop computer or in a laptop computer. In other embodiments, only a portion of system 400 may be included in a single system unit. For example, only portion 499 of system 400 may be included in a desktop computer, a laptop computer, a digital hand-held system such as a cellular phone.

The illustration of system 400 in FIG. 4 is intended to provide a general understanding of the structure of various embodiments described herein. System 400 is not intended to serve as a complete description of all the elements and features of systems that might make use of the structures described herein.

System 400 includes various modes of operation including suspend and resume operations. In some embodiments, the suspend and resume operations in system 400 are performed by USB host controller 408 and at least one of the peripheral device 410, keypad or keyboard 412, display 414, and USB hub device 416. In other embodiments, the suspend and resume operations in system 400 are performed by USB hub device 416 and at least one of the USB devices 418 and 420.

In some embodiments, USB host controller 408 and at least one of the peripheral device 410, keypad or keyboard 412, display 414, USB hub device 416, USB device 418, and USB device 420 are configured to perform the suspend and resume operations described in FIG. 1 through FIG. 3. Thus, in some embodiments, suspend and resume operations, as described in FIG. 1 through FIG. 3, may occur in devices coupled between any one of the USB segments 431, 432, 433, 434, 435, and 436 of system 400. Using the suspend and resume communication described herein may improve power management in system 400 to save power. Thus, the life of battery 402 may be extended.

Figure 5:
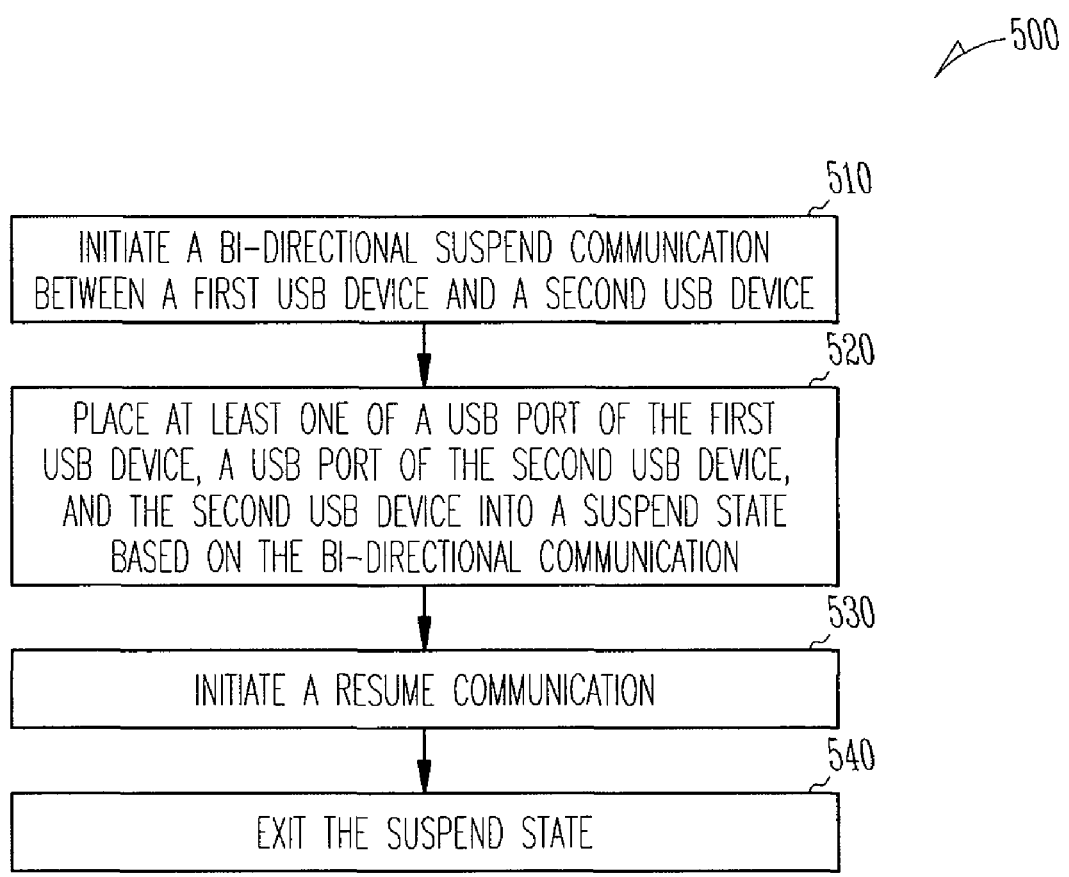
FIG. 5 is a flowchart showing a method for suspend and resume operations according to an embodiment of the invention.

FIG. 5 is a flowchart showing a method for suspend and resume operations according to an embodiment of the invention. In some embodiments, method 500 may be used in apparatus 100 of FIG. 1 and system 400 of FIG. 4.

In FIG. 5, box 510 initiates a bi-directional suspend communication between a first USB device and a second USB device. The first and second USB devices may be in an enabled state before the bi-directional suspend communication is initiated. The bi-directional suspend communication may include the first USB device sending a suspend command on a USB segment. The USB segment is coupled between a USB port of the first and a USB port of the second USB device. The bi-directional suspend communication may also include the second USB device detecting the suspend command and sending a suspend response to the first USB device.

In some embodiments, the suspend command sent by the first USB device may include a transaction, a special signaling, or a series of special signaling. The transition may include a suspend token packet. In other embodiments, the suspend command sent by the first USB device may include a permission to allow the second USB device to initiate remote-wakeup resume communication to exit a suspend state.

In some embodiments, the suspend response sent by the second USB device in box 510 may include a transaction, a special signaling, or a series of special signaling. The transition may include a handshake packet.

The bi-directional suspend communication in box 510 may include embodiments of the suspend communication described in FIG. 1 and FIG. 2.

In FIG. 5, box 520 places at least one of the USB port of the first USB device, the USB port of the second USB device, and the second USB device into a suspend state based on the bi-directional suspend communication. For example, box 520 may place both the USB port of the first USB device and the USB port of the second USB device into a suspend state based on the bi-directional suspend communication. In some embodiments, the second USB device is in an enabled stated while the USB port of the second device is in the suspend state. Thus, the state of USB port of the second USB device and the state of the second USB device may be different after the suspend communication is performed.

In some embodiments, at least one of the USB port of the first USB device, the USB port of the second USB device, and the second USB device is placed into the suspend state without waiting for more than three milliseconds of idling or inactivity on the USB segment. The USB segment is in an idle state when least one of the USB port of the first USB device, the USB port of the second USB device, and the second USB device is placed into the suspend state. In some embodiments, the data lines of the USB segment are decoupled from a power source when the USB segment in the idle state.

In box 530 of FIG. 5, a resume communication is initiated to start a resume operation. The resume communication may be initiated by either the first USB device or the second USB device.

If the first USB device initiates the resume communication, the first USB device drives a data signaling on the USB segment for a driving duration. At the end of the driving duration, the first USB device issues an End-of-Resume (EOR) signaling on the USB segment. The EOR signaling indicates the completion of the resume communication.

If the second USB device initiates the resume communication, the second USB device drives a data signaling on the USB segment for a first duration. At some time during the first duration, the first USB device detects the data signaling from the second USB device and drives a second data signaling to the second USB device for a second duration. The first duration ends before the second duration ends. At the end of the second duration, the first USB device issues the EOR signaling on the USB segment.

Thus, regardless of which of the first and second USB devices initiates the resume communication, the first USB device issues the EOR signaling on the USB segment. The data signaling and the EOR signaling may include the data L signaling and the EOR signaling described in FIG. 3.

In box 540 of FIG. 5, either the USB port of the second USB device, or both the USB port of the second USB device and the second USB device exits the suspend state. In some embodiments, the USB port of the second USB device or both the USB port of the second USB device and the second USB device exits the suspend state the second USB device exits the suspend state after the EOR signaling (box 530) is detected and after a transition interval.

The individual activities shown in FIG. 5 do not have to be performed in the order illustrated or in any particular order. Moreover, various activities described with respect to the methods identified herein can be executed in serial or parallel fashion. Some activities may be repeated indefinitely, and others may occur only once. Various embodiments may have more or fewer activities than those illustrated.

Figure 6:
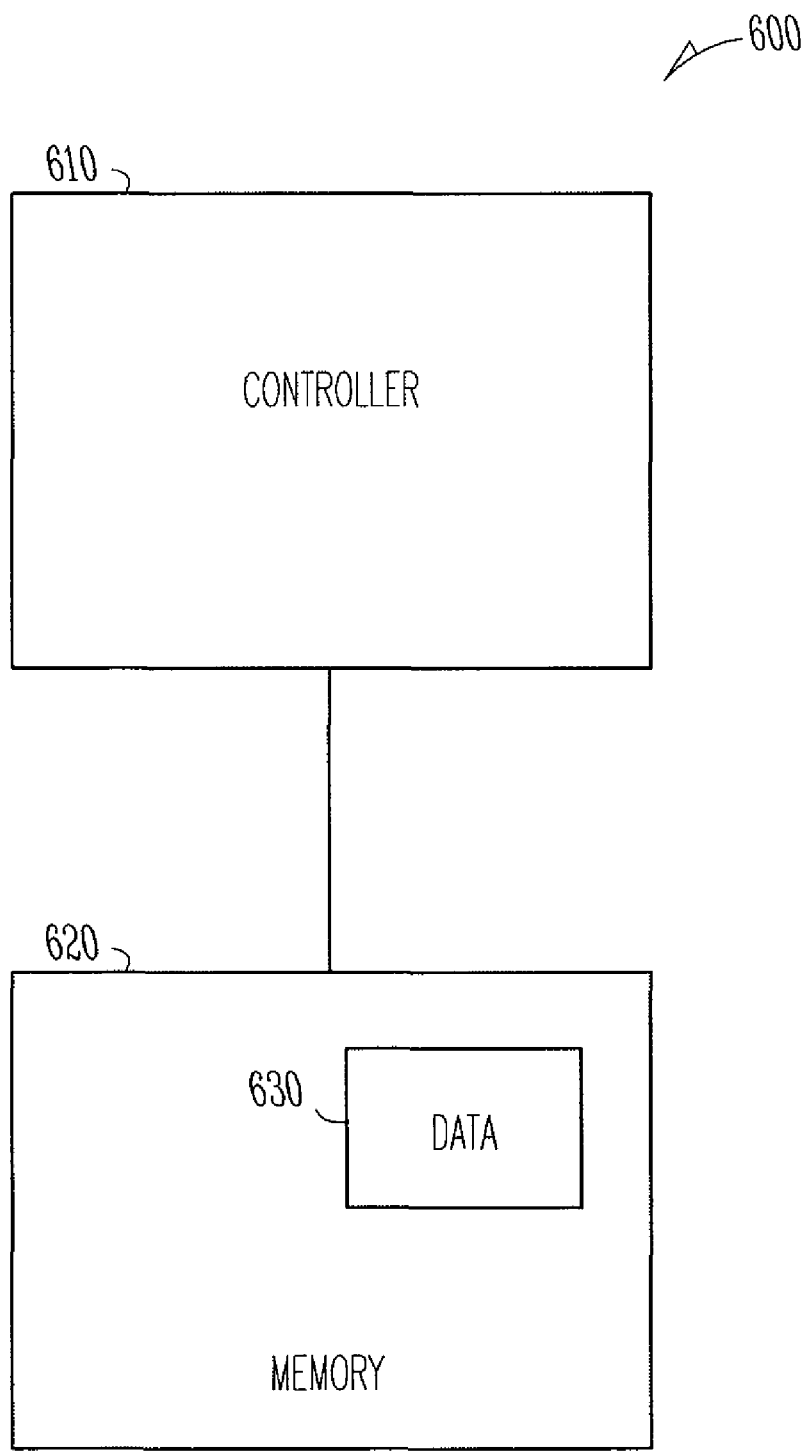
FIG. 6 is a block diagram of an article according to an embodiment of the invention.

FIG. 6 is a block diagram of an article 600 according to an embodiment of the invention. Article 600 may include a computer, a memory system, a magnetic or optical disk, other type of storage devices, a hand-held system such as a cellular phone, or other electronic systems. Article 600 includes a controller 610 coupled to a machine-accessible medium such as a memory 620. Controller 610 may include any combination of a general-purpose processor, an application specific integrated circuit, a chipset including an input/output control unit, and one or more USB devices including a USB host controller. Memory 620 may be removable storage media. Memory 620 may include any type of memory such as electrical, optical, or electromagnetic. Memory 620 has associated information or data 630. Examples of associated information 630 are computer program instructions. Associated information 630, when accessed, results in a machine (for example, controller 610) performing activities such as initiating a suspend communication on a USB segment coupled between a first USB device and a second USB device, and placing the second USB device into a suspend state based on the suspend communication between the first and second USB devices. Other activities may include initiating a resume communication, and exiting the suspend state based on the resume communication. The activities performed when associated information 630 is accessed may include activities described in FIG. 1 through FIG. 5.

Improved power management may result from implementing the apparatus, systems, and methods described in FIG. 1 through FIG. 6.

The above description and the drawings illustrate some specific embodiments of the invention sufficiently to enable those skilled in the art to practice the embodiments of the invention. Other embodiments may incorporate structural, logical, electrical, process, and other changes. In the drawings, like features or like numerals describe substantially similar devices throughout the several views. Examples merely typify possible variations. Portions and features of some embodiments may be included in or substituted for those of others. Many other embodiments will be apparent to those of skill in the art upon reading and understanding the above description. Therefore, the scope of various embodiments is determined by the appended claims, along with the full range of equivalents to which such claims are entitled.

What is claimed is:

1. A system comprising:
   one or more controllers;
   a display;
   a battery to supply power;
   an antenna to provide wireless communication; and
   a circuit having a first port to be coupled to communicate over data lines with a Universal Serial Bus (USB) port of a device external to the system, the circuit arranged to drive resume signaling for a duration of less than one millisecond to initiate transition of the first port from a first state corresponding to an idle state of the data lines to a second, enabled state,
   wherein the circuit is arranged to send a command to the USB port to allow the first port to be placed in the first state corresponding to an idle state of the data lines, and
   wherein the circuit is arranged to receive an acknowledgement response from the USB port and to place the first port in the first state in response to the acknowledgement response.

2. The system of claim 1, wherein the circuit is arranged to drive resume signaling for a duration of less than one hundred microseconds.

3. The system of claim 1, wherein the circuit is arranged to indicate to the device external to the system whether the device external to the system is permitted to initiate a resume.

4. The system of claim 1, wherein the circuit is arranged to detect resume signaling of a duration of less than one millisecond and to transition the first port from the first state corresponding to an idle state of the data lines to the second, enabled state in response to the resume signaling.

5. The system of claim 4, wherein the circuit is arranged to detect resume signaling of a duration of less than one hundred milliseconds.

6. The system of claim 1, wherein the device external to the system is arranged to communicate with the system in accordance with the Universal Serial Bus Specification, Revision 2.0.

7. A system comprising:
   one or more controllers;
   a display;
   a battery to supply power;
   an antenna to provide wireless communication; and
   a circuit having a first port to be coupled to communicate over data lines with a Universal Serial Bus (USB) port of a device external to the system, the circuit arranged to detect resume signaling for a duration of less than one millisecond and to transition the first port from a first state corresponding to an idle state of the data lines to a second, enabled state in response to the resume signaling, wherein the circuit is arranged to receive a command from the USB port and to send an acknowledgement response to the USB port in response to the command to allow the first port and/or the USB port to be placed in the first state corresponding to an idle state of the data lines.

8. The system of claim 7, wherein the circuit is arranged to detect resume signaling of a duration of less than one hundred milliseconds.

9. The system of claim 7, wherein the device external to the system is arranged to communicate with the system in accordance with Universal Serial Bus Specification, Revision 2.0.

10. A apparatus comprising:
a display; and
a circuit having a first port to be coupled to communicate over data lines with a Universal Serial Bus (USB) port of a device external to the apparatus, the circuit arranged to detect resume signaling of a duration of less than one millisecond and to transition the first port from a first state corresponding to an idle state of the data lines to a second, enabled state in response to the resume signaling, wherein the circuit is arranged to receive a command from the USB port and to send an acknowledgement response to the USB port in response to the command to allow the first port and/or the USB port to be placed in the first state corresponding to an idle state of the data lines.

11. The apparatus of claim 10, wherein the circuit is arranged to detect resume signaling of a duration of less than one hundred microseconds.

12. The apparatus of claim 10, wherein the circuit is arranged to receive an indication from the USB port as to whether the circuit is permitted to initiate a resume.

13. The apparatus of claim 10, wherein the circuit is arranged to drive resume signaling for a duration of less than one millisecond to initiate transition of the first port from the first state corresponding to an idle state of the data lines to the second, enabled state.

14. The apparatus of claim 10, wherein the device external to the apparatus is arranged to communicate with the apparatus in accordance with Universal Serial Bus Specification, Revision 2.0.

15. A system comprising:
one or more controllers;
a display;
a battery to supply power;
an antenna to provide wireless communication; and
a circuit having a first port to be coupled to communicate over data lines with a Universal Serial Bus (USB) port of a device external to the system, the circuit arranged to drive resume signaling for a duration of less than one millisecond to initiate transition of the first port from a first state corresponding to an idle state of the data lines to a second, enabled state,
wherein the circuit is arranged to send a token packet to the USB port to allow the first port to be placed in the first state corresponding to an idle state of the data lines, and wherein the circuit is arranged to receive a handshake packet from the USB port and to place the first port in the first state in response to the handshake packet.

16. The system of claim 15, wherein the circuit is arranged to drive resume signaling for a duration of less than one hundred microseconds.

17. The system of claim 15, wherein the circuit is arranged to indicate to the device external to the system whether the device external to the system is permitted to initiate a resume.

18. The system of claim 15, wherein the circuit is arranged to detect resume signaling of a duration of less than one millisecond and to transition the first port from the first state corresponding to an idle state of the data lines to the second, enabled state in response to the resume signaling.

19. The system of claim 18, wherein the circuit is arranged to detect resume signaling of a duration of less than one hundred microseconds.

20. The system of claim 15, wherein the device external to the system is arranged to communicate with the system in accordance with Universal Serial Bus Specification, Revision 2.0.

21. A system comprising:
one or more controllers;
a display;
a battery to supply power;
an antenna to provide wireless communication; and
a circuit having a first port to be coupled to communicate over data lines with a Universal Serial Bus (USB) port of a device external to the system, the circuit arranged to detect resume signaling of a duration of less than one millisecond and to transition the first port from a first state corresponding to an idle state of the data lines to a second, enabled state in response to the resume signaling,
wherein the circuit is arranged to receive a token packet from the USB port and to send a handshake packet to the USB port in response to the token packet to allow the first port and/or the USB port to be placed in the first state corresponding to an idle state of the data lines.

22. The system of claim 21, wherein the circuit is arranged to detect resume signaling of a duration of less than one hundred microseconds.

23. The system of claim 21, wherein the device external to the system is arranged to communicate with the system in accordance with Universal Serial Bus Specification, Revision 2.0.

24. An apparatus comprising:
a display; and
a circuit having a first port to be coupled to communicate over data lines with a Universal Serial Bus (USB) port of a device external to the apparatus, the circuit arranged to detect resume signaling of a duration of less than one millisecond and to transition the first port from a first state corresponding to an idle state of the data lines to a second, enabled state in response to the resume signaling,
wherein the circuit is arranged to receive a token packet from the USB port and to send a handshake packet to the USB port in response to the token packet to allow the first port and/or the USB port to be placed in the first state corresponding to an idle state of the data lines.

25. The apparatus of claim 24, wherein the circuit is arranged to detect resume signaling of a duration of less than one hundred microseconds.

26. The apparatus of claim 24, wherein the circuit is arranged to receive an indication from the USB port as to whether the circuit is permitted to initiate a resume.

27. The apparatus of claim 24, wherein the circuit is arranged to drive resume signaling for a duration of less than one millisecond to initiate transition of the first port from the first state corresponding to an idle state of the data lines to the second, enabled state.

28. The apparatus of claim 24, wherein the device external to the apparatus is arranged to communicate with the apparatus in accordance with Universal Serial Bus Specification, Revision 2.0.

* * * * *